US012630709B2

(12) United States Patent
Ko et al.

(10) Patent No.: US 12,630,709 B2
(45) Date of Patent: May 19, 2026

(54) COMPOSITE RESIN COMPOSITION FOR AUTOMOTIVE INTERIOR MATERIALS AND AUTOMOTIVE INTERIOR MATERIAL INCLUDING THE SAME

(71) Applicant: LG CHEM, LTD., Seoul (KR)

(72) Inventors: Gun Ko, Daejeon (KR); Seonho Kong, Daejeon (KR); Sun Mo Son, Daejeon (KR); Hyun Seok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 500 days.

(21) Appl. No.: 18/267,938

(22) PCT Filed: Dec. 26, 2022

(86) PCT No.: PCT/KR2022/021260
§ 371 (c)(1),
(2) Date: Jun. 16, 2023

(87) PCT Pub. No.: WO2024/005288
PCT Pub. Date: Jan. 4, 2024

(65) Prior Publication Data
US 2024/0309203 A1      Sep. 19, 2024

(30) Foreign Application Priority Data

Jun. 27, 2022      (KR) ........................ 10-2022-0078188

(51) Int. Cl.
| | |
|---|---|
| *C08L 67/02* | (2006.01) |
| *B29C 48/00* | (2019.01) |
| *B29C 48/40* | (2019.01) |
| *C08K 3/32* | (2006.01) |
| *C08K 5/13* | (2006.01) |
| *C08K 7/14* | (2006.01) |
| *C08K 9/02* | (2006.01) |
| *B29K 67/00* | (2006.01) |
| *B29K 309/08* | (2006.01) |
| *B29L 31/30* | (2006.01) |
| *B29L 31/34* | (2006.01) |

(52) U.S. Cl.
CPC ............ *C08L 67/02* (2013.01); *B29C 48/022* (2019.02); *B29C 48/40* (2019.02); *C08K 3/32* (2013.01); *C08K 5/13* (2013.01); *C08K 7/14* (2013.01); *C08K 9/02* (2013.01); *B29K 2067/006* (2013.01); *B29K 2309/08* (2013.01); *B29K 2995/0016* (2013.01); *B29K 2995/0082* (2013.01); *B29L 2031/30* (2013.01); *B29L 2031/3481* (2013.01); *C08K 2003/324* (2013.01); *C08K 2201/003* (2013.01); *C08K 2201/004* (2013.01); *C08L 2201/08* (2013.01); *C08L 2205/035* (2013.01)

(58) Field of Classification Search
CPC ................ C08L 67/02; C08L 2201/08; C08L 2205/035; C08L 33/06; C08L 2205/025; C08L 2205/03; C08L 13/00; C08L 33/068; C08L 2205/04; B29C 48/022; B29C 48/40; C08K 3/32; C08K 5/13; C08K 7/14; C08K 9/02; C08K 2003/324; C08K 2201/003; C08K 2201/004; B29K 2067/006; B29K 2309/08; B29K 2995/0016; B29K 2995/0082; B29L 2031/30; B29L 2031/3481
See application file for complete search history.

(56) References Cited

U.S. PATENT DOCUMENTS

| | | | | |
|---|---|---|---|---|
| 2012/0163987 A1* | 6/2012 | Hausrath | ................ | C03C 3/087 |
| | | | | 416/241 R |
| 2016/0152514 A1 | 6/2016 | Li et al. | | |
| 2019/0159371 A1* | 5/2019 | Grinsteinner | ......... | G01S 7/4813 |
| 2022/0356344 A1 | 11/2022 | Kim et al. | | |

FOREIGN PATENT DOCUMENTS

| | | | | | |
|---|---|---|---|---|---|
| CN | 102617997 | A | | 8/2012 | |
| CN | 106479139 | A | * | 3/2017 | .............. C08L 67/02 |
| CN | 105086381 | B | | 4/2017 | |
| GB | 1159689 | A | * | 7/1969 | .............. C08L 27/06 |
| JP | 4331722 | | | 9/2009 | |
| JP | 2019-147934 | | | 9/2019 | |
| KR | 10-0524162 | | | 12/2005 | |
| KR | 10-2009-0072021 | | | 7/2009 | |
| KR | 101078837 | B1 | * | 11/2011 | .............. C08K 7/14 |

(Continued)

OTHER PUBLICATIONS

Machine translation of KR_101078837 (Year: 2011).*
Machine translation of CN_106479139 (Year: 2017).*

*Primary Examiner* — Doris L Lee
(74) *Attorney, Agent, or Firm* — Bryan Cave Leighton Paisner LLP

(57) ABSTRACT

Provided is a composite resin composition for automotive interior materials and an automotive interior material including the same. The composite resin composition comprises: 47 to 52 wt % of a polybutylene terephthalate resin; 10 to 28 wt % of a (meth)acrylate compound-conjugated diene compound-aromatic vinyl compound copolymer; 8 to 14 wt % of a polyethylene terephthalate resin; 0.1 to 2.2 wt % of a carboxy reactive epoxy resin; and 10 to 28 wt % of glass fiber containing $SiO_2$, CaO, and $Al_2O_3$, wherein an $SiO_2$ content is greater than a sum of a CaO content and an $Al_2O_3$ content. By changing conventional components, the composite resin composition for automotive interior materials provided herein has an effect of improving heat resistance, impact stability, and crystallization rate controllability, satisfying physical property balance between mechanical properties and fluidity, and providing excellent product reliability and appearance.

11 Claims, No Drawings

(56)         References Cited

FOREIGN PATENT DOCUMENTS

| KR | 10-2018-0078908 | 7/2018 |
| KR | 10-2019-0027115 | 3/2019 |
| KR | 10-2189455 | 12/2020 |
| KR | 10-2021-0001616 A | 1/2021 |

* cited by examiner

COMPOSITE RESIN COMPOSITION FOR AUTOMOTIVE INTERIOR MATERIALS AND AUTOMOTIVE INTERIOR MATERIAL INCLUDING THE SAME

CROSS-REFERENCE TO RELATED APPLICATION

This application is a National Stage Application of International Application No. PCT/KR2022/021260 filed on Dec. 26, 2022, which claims priority to Korean Patent Application No. 10-2022-0078188, filed on Jun. 27, 2022, in the Korean Intellectual Property Office, the disclosure of which is incorporated herein by reference.

TECHNICAL FIELD

The present invention relates to a composite resin composition for automotive interior materials, and an automotive interior material including the same. More particularly, the present invention relates to a composite resin composition for automotive interior materials that is capable of improving heat resistance, impact stability, and crystallization rate controllability, satisfies physical property balance between mechanical properties and fluidity, and is capable of providing excellent product reliability and appearance; and an automotive interior material including the composite resin composition.

BACKGROUND

Examples of conventional resins used in automotive interior materials include an acrylonitrile-butadiene-styrene (ABS) resin, a composite resin (PC/ABS) obtained by mixing a polycarbonate resin and an acrylonitrile-butadiene-styrene resin, a composite resin (PC/PBT) obtained by mixing a polycarbonate resin and a polybutylene terephthalate resin, and the like. These resins have excellent physical properties and are used in the manufacture of various automotive interior materials.

However, in a high temperature and high humidity environment, the resins can be hydrolyzed and the physical properties thereof can be deteriorated. When a polycarbonate (PC) resin and a polybutylene terephthalate (PBT) resin are mixed, the physical properties thereof can be deteriorated by transesterification. Accordingly, a method of appropriately suppressing the reaction is required.

Therefore, it is necessary to develop a material for automotive interior materials that is capable of providing excellent mechanical properties and heat resistance without causing hydrolysis even under a high temperature and high humidity environment in addition to a dry environment.

RELATED ART DOCUMENTS

Patent Documents

KR 2018-0078908 A (Publication date: Jul. 10, 2018)

BRIEF DESCRIPTION

Technical Problem

Therefore, the present invention has been made in view of the above problems, and it is one object of the present invention to provide a composite resin composition for automotive interior materials that is capable of improving heat resistance, impact stability, and crystallization rate controllability, satisfies physical property balance between mechanical properties and fluidity, and is capable of providing excellent product reliability and appearance. According to the present invention, when preparing the composite resin composition of the present invention, by changing conventional components, cost can be reduced, and the composite resin composition can be used in the manufacture of unpainted products. Thus, the composition of the present invention can also provide excellent economics.

It is another object of the present invention to provide an automotive interior material including the composite resin composition for automotive interior materials.

The above and other objects can be accomplished by the present invention described below.

Technical Solution

In accordance with one aspect of the present invention, provided is a composite resin composition, including:

- 47 to 52% by weight of a polybutylene terephthalate resin;
- 10 to 28% by weight of a (meth)acrylate compound-conjugated diene compound-aromatic vinyl compound copolymer;
- 8 to 14% by weight of a polyethylene terephthalate resin;
- 0.1 to 2.2% by weight of a carboxy reactive epoxy resin; and
- 10 to 28% by weight of glass fiber containing $SiO_2$, Cao, and $Al_2O_3$, wherein an $SiO_2$ content is greater than a sum of a Cao content and an $Al_2O_3$ content.

The polybutylene terephthalate resin can have an intrinsic viscosity of 0.45 to 0.85 dl/g.

The polyethylene terephthalate resin can have an intrinsic viscosity of 0.78 to 1.2 dl/g.

The (meth)acrylate compound-conjugated diene compound-aromatic vinyl compound copolymer can include a graft copolymer prepared by polymerizing 40 to 80% by weight of a conjugated diene compound, 10 to 40% by weight of an aromatic vinyl compound, and 1 to 20% by weight of a (meth)acrylate compound.

The (meth)acrylate compound-conjugated diene compound-aromatic vinyl compound copolymer can have a particle size of 0.2 to 0.4 μm.

The carboxy reactive epoxy resin can include one or more selected from an ethylene-n-butyl acrylate-glycidyl methacrylate copolymer, an ethylene-glycidyl methacrylate copolymer, an ethylene-acrylic ester-glycidyl methacrylate copolymer, an ethylene-methyl acrylate-glycidyl methacrylate copolymer, an ethylene-dimethacrylate-glycidyl methacrylate copolymer, an ethylene-acrylate-glycidyl methacrylate copolymer, and an ethylene-vinyl acetate-glycidyl methacrylate copolymer.

The carboxy reactive epoxy resin can include 1 to 15% by weight of a glycidyl methacrylate-derived monomer.

An intrinsic viscosity of the polybutylene terephthalate resin can be less than an intrinsic viscosity of the polyethylene terephthalate resin.

The polyethylene terephthalate resin can have a melting point of 250 to 256° C.

The composite resin composition can include one or more additives selected from a low-viscosity polyethylene-based lubricant, a hydrolysis suppressor, and a phenolic antioxidant.

Based on 100% by weight in total of the components constituting the composite resin composition, the additives can be included in an amount of 0.01 to 10% by weight.

The composite resin composition can have a high-load heat resistance of 180° C. or higher as measured under 1.82 MPa according to ISO 75.

The composite resin composition can have a flexural strength of 140 MPa or more and a flexural modulus of 5,000 MPa or more as measured at a rate of 2 mm/min using an ⅛-inch specimen using a SPAN 64 according to ISO 178.

In accordance with another aspect of the present invention, provided is a composite resin composition, including: 47 to 52% by weight of a polybutylene terephthalate resin; 10 to 28% by weight of a (meth)acrylate compound-conjugated diene compound-aromatic vinyl compound copolymer; 8 to 14% by weight of a polyethylene terephthalate resin; 0.1 to 2.2% by weight of a carboxy reactive epoxy resin; and 10 to 28% by weight of glass fiber containing $SiO_2$, Cao, and $Al_2O_3$, wherein an $SiO_2$ content is greater than a sum of a Cao content and an $Al_2O_3$ content, wherein an intrinsic viscosity of the polybutylene terephthalate resin is less than an intrinsic viscosity of the polyethylene terephthalate resin.

In accordance with still another aspect of the present invention, provided is a method of preparing a composite resin composition, including:

melt-kneading and extruding, using an extruder, 47 to 52% by weight of a polybutylene terephthalate resin; 10 to 28% by weight of a (meth)acrylate compound-conjugated diene compound-aromatic vinyl compound copolymer; 8 to 14% by weight of a polyethylene terephthalate resin; 0.1 to 2.2% by weight of a carboxy reactive epoxy resin; and 10 to 28% by weight of glass fiber containing $SiO_2$, Cao, and $Al_2O_3$, wherein an $SiO_2$ content is greater than a sum of a Cao content and an $Al_2O_3$ content.

The melt-kneading and extruding of the composite resin composition can be performed at a temperature of 250 to 300° C., a flow ratio (F/R) of 10 to 55 kg/hr, and a screw rotation rate of 150 to 600 rpm.

After extruding the composite resin composition, the method can include performing injection at an injection temperature 240 to 280° C. and a mold temperature of 40 to 80° C.

In accordance with still another aspect of the present invention, provided is a method of preparing a composite resin composition, including:

melt-kneading and extruding, using an extruder, 47 to 52% by weight of a polybutylene terephthalate resin; 10 to 28% by weight of a (meth)acrylate compound-conjugated diene compound-aromatic vinyl compound copolymer; 8 to 14% by weight of a polyethylene terephthalate resin; 0.1 to 2.2% by weight of a carboxy reactive epoxy resin; 10 to 28% by weight of glass fiber containing $SiO_2$, Cao, and $Al_2O_3$, wherein an $SiO_2$ content is greater than a sum of a Cao content and an $Al_2O_3$ content; and 0.01 to 10% by weight of additives, wherein an intrinsic viscosity of the polybutylene terephthalate resin is less than an intrinsic viscosity of the polyethylene terephthalate resin.

In accordance with yet another aspect of the present invention, provided is an automotive interior material, including:

the above-described composite resin composition.

The automotive interior material can be a housing for automotive electronic device integration control components (body control module).

Advantageous Effects

A composite resin composition for automotive interior materials according to the present invention includes a specific content (wt %) of a polybutylene terephthalate resin, a specific content (wt %) of a polyethylene terephthalate resin, a specific content (wt %) of a (meth)acrylate compound-conjugated diene compound-aromatic vinyl compound copolymer, and a specific content (wt %) of a carboxy reactive epoxy resin, and an automotive interior material can be manufactured by molding the composite resin composition.

In addition, when an automotive interior material is manufactured using the composition of the present invention, the heat resistance, impact stability, and crystallization rate controllability of the manufactured automotive interior material can be improved. Thus, the automotive interior material can satisfy physical property balance between mechanical properties and fluidity. In addition, due to excellent moldability, the appearance of the automotive interior material can be improved.

Therefore, the composite resin composition for automotive interior materials and the molded article according to the present invention can be applied to automotive interior materials such as a housing for automotive electronic device integration control components (body control module) requiring the effects described above.

DETAILED DESCRIPTION

Hereinafter, the present invention will be described in more detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

In this description, a polymer including a certain compound means a polymer prepared by polymerizing the compound, and a unit in the polymer is derived from the compound.

Unless otherwise specified, all numbers, values, and/or expressions expressing quantities of ingredients, reaction conditions, polymer compositions, and formulations used herein are to be understood as being qualified by the term "about." This is because these numbers are essentially approximations that reflect, among other things, the various uncertainties of measurement that arise in obtaining these values. In addition, when numerical ranges are disclosed in this disclosure, such ranges are contiguous and include all values from the minimum value to the maximum value of such ranges unless otherwise indicated. Also, when such ranges refer to integers, all integers inclusive from the minimum value to the maximum value are included unless otherwise specified.

In the present disclosure, when a range is specified for a variable, it will be understood that the variable includes all values within a range including the endpoints of the range. For example, a range of "5 to 10" includes values of 5, 6, 7, 8, 9, and 10, any subranges such as 6 to 10, 7 to 10, 6 to 9, and 7 to 9, and any values among integers that fit within the scope of a range such as 5.5 to 8.5 and 6.5 to 9. Also, a range of 10 to 30% includes values such as 10%, 11%, 12%, and 13%, all integers up to 30%, and any values among all reasonable integers within the scope of a range, such as 10.5%, 15.5%, 25.5%.

As used herein, the "hydrolysis stabilizer" refers to a material added to improve impact stability and crystallization rate controllability, unless otherwise specified.

Here, the impact stability can refer to the property of providing impact resistance during crystallization of the composite resin, and the crystallization rate controllability can mean ability to control the rate of crystallization of the composite resin.

The present inventors confirmed that, when an automotive interior material was manufactured using a composite resin composition including a composite resin including a specific content (wt %) of a polybutylene terephthalate resin and a specific content (wt %) of a polyethylene terephthalate resin; and a hydrolysis stabilizer obtained by mixing a specific content (wt %) of a (meth)acrylate compound-conjugated diene compound-aromatic vinyl compound copolymer and a specific content (wt %) of a carboxy reactive epoxy resin, the heat resistance, impact stability, and crystallization rate controllability of the automotive interior material were improved, and thus the automotive interior material could satisfy physical property balance between mechanical properties and fluidity and provide excellent product reliability and appearance. Based on these results, the present inventors completed the present invention by providing an unpainted product, as an automotive interior material, satisfying physical property balance between mechanical properties and fluidity and having excellent moldability and appearance.

Composite Resin Composition

A composite resin composition according to one embodiment of the present invention includes 47 to 52% by weight of a polybutylene terephthalate resin; 10 to 28% by weight of a (meth)acrylate compound-conjugated diene compound-aromatic vinyl compound copolymer; 8 to 14% by weight of a polyethylene terephthalate resin; 0.1 to 2.2% by weight of a carboxy reactive epoxy resin; and 10 to 28% by weight of glass fiber containing $SiO_2$, Cao, and $Al_2O_3$, wherein an $SiO_2$ content is greater than a sum of a Cao content and an $Al_2O_3$ content.

In the present disclosure, unless otherwise specified, melt flow rate can be measured at 260° C. under a load of 5 kg according to ISO 1133.

The polybutylene terephthalate resin and the polyethylene terephthalate resin according to an embodiment of the present invention are crystalline materials. When a composite resin composition includes these resins, moldability can be imparted to the composite resin composition. In addition, when an automobile interior material is manufactured using the composite resin composition, chemical resistance can be imparted to the automobile interior material.

The polybutylene terephthalate resin is a crystalline resin that prevents penetration of chemicals from the outside. In addition, since the polybutylene terephthalate resin has a crystallized structure, the flowability of a composite resin composition including the same can be improved during injection molding, and as a result, excellent appearance can be obtained.

The polybutylene terephthalate resin can have an intrinsic viscosity of 0.45 to 0.77 dl/g or 0.55 to 0.75 dl/g. When the intrinsic viscosity of the polybutylene terephthalate resin is less than the range, the effect of reinforcing physical properties can be reduced, and thus the effect of improving chemical resistance can be insignificant. When the intrinsic viscosity exceeds the range, moldability can be reduced, and thus the appearance of a product can be poor.

In the present disclosure, when intrinsic viscosity is measured, unless noted otherwise, a sample solution with a concentration of 0.05 g/ml is prepared by completely dissolving a sample in methylene chloride as a solvent, and then is filtered using a filter to obtain a filtrate. Then, using the obtained filtrate, intrinsic viscosity is measured at 20° C. using a Ubbelohde viscometer.

Based on 100% by weight in total of the components constituting the composition, the polybutylene terephthalate resin can be included in an amount of 47 to 52% by weight, as a specific example, 48 to 52% by weight, preferably 48.5 to 52% by weight, more preferably 49 to 52% by weight, still more preferably 49 to 51.5% by weight. When the polybutylene terephthalate resin is included in an amount less than the range, cracks can occur in an automotive interior material manufactured using a composite resin composition including the same. When the polybutylene terephthalate resin is included in an amount exceeding the range, the rigidity and heat resistance of an automotive interior material manufactured using a composite resin composition including the same can be reduced.

The intrinsic viscosity of the polybutylene terephthalate resin can be greater than the intrinsic viscosity of the polyethylene terephthalate resin.

In the present disclosure, the polyethylene terephthalate resin can have an intrinsic viscosity of preferably 0.78 to 1.2 dl/g or 0.78 to 1.1 dl/g. When the intrinsic viscosity of the polyethylene terephthalate resin is less than the range, the effect of reinforcing physical properties can be reduced, and thus the effect of improving chemical resistance can be insignificant. When the intrinsic viscosity exceeds the range, moldability can be reduced, and thus the appearance of a product can be poor.

The polyethylene terephthalate resin can include a crystallization rate reducing agent.

The crystallization rate reducing agent can include one or more selected from the group consisting of isophthalic acid, cyclohexylene dimethanol, diethylene glycol, and neopentyl glycol. Preferably, isophthalic acid or cyclohexylene dimethanol can be used in consideration of reaction efficiency.

In the step of preparing the polyethylene terephthalate resin, the crystallization rate reducing agent can be added in combination with raw materials including terephthalic acid and ethylene glycol, or can be added after performing primary reaction with terephthalic acid and ethylene glycol.

Based on a total weight of the polyethylene terephthalate resin including the crystallization rate reducing agent, the crystallization rate reducing agent can be used in an amount of less than 20% by weight or 1 to 10% by weight, as a specific example, 1 to 5% by weight.

The type of the polyethylene terephthalate resin is not particularly limited, and a polyethylene terephthalate resin prepared using a method known in the art or a commercially available product can be used.

For example, when a polyethylene terephthalate resin is prepared and used, the polyethylene terephthalate resin can be prepared by reacting a terephthalic acid compound and a glycol compound (excluding diethylene glycol and neopentyl glycol) such as ethylene glycol with one or more selected from the group consisting of isophthalic acid, cyclohexylene dimethanol, diethylene glycol, and neopentyl glycol in the presence of the crystallization rate reducing agent.

The polyethylene terephthalate resin can have a melting point of 250° C. or higher, as a specific example, 250 to 256° C. In this case, the melt flow index of the composite resin composition can be improved, thereby improving moldability.

The polyethylene terephthalate resin can have a crystallization temperature (Tm) of 250° C. or higher, as a specific example, 250 to 258° C. In this case, the melt flow index of the composite resin composition can be improved, thereby improving moldability.

In the present disclosure, melting point can be measured using methods known in the art. For example, melting point can be determined based on thermal absorption peaks using a differential scanning calorimeter (DSC).

Based on 100% by weight in total of the components constituting the composition, the polyethylene terephthalate resin can be included in an amount of 8 to 14% by weight, as a preferred example, 9 to 15% by weight, as a more preferred example, 9 to 13% by weight, as a still more preferred example, 9 to 12% by weight, as a most preferred example, 9 to 11% by weight. When the polyethylene terephthalate resin is included in an amount less than the range, cracks can occur in an automotive interior material manufactured using a composite resin composition including the same. When the polyethylene terephthalate resin is included in an amount exceeding the range, the rigidity and heat resistance of an automotive interior material manufactured using a composite resin composition including the same can be reduced.

When the (meth)acrylate compound-conjugated diene compound-aromatic vinyl compound copolymer is used in combination with the carboxy reactive epoxy resin, hydrolytic stability can be realized.

In the present disclosure, the content (wt %) of a unit in a polymer, a monomer, or a block can mean the content (wt %) of a derived monomer.

In the present disclosure, the content (wt %) of a unit in a polymer, a monomer, or a block can be measured using measurement methods commonly used in the art to which the present invention pertains, or the content of added monomers can be defined as the content of units in a prepared polymer under the premise that all monomers are polymerized.

The (meth)acrylate compound-conjugated diene compound-aromatic vinyl compound copolymer according to an embodiment of the present invention can improve heat resistance, and thus an automotive interior material manufactured using a composite resin composition including the same can have excellent mechanical properties, such as impact resistance, excellent impact stability, and crystallization rate controllability.

The (meth)acrylate compound-conjugated diene compound-aromatic vinyl compound copolymer can be a graft copolymer prepared by polymerizing 40 to 80% by weight of a conjugated diene compound, 10 to 40% by weight of an aromatic vinyl compound, and 1 to 20% by weight of a (meth)acrylate compound, preferably a graft copolymer prepared by polymerizing 50 to 70% by weight of a conjugated diene compound, 20 to 35% by weight of an aromatic vinyl compound, and 1 to 15% by weight of a (meth)acrylate compound, more preferably a graft copolymer prepared by polymerizing 55 to 65% by weight of a conjugated diene compound, 25 to 35% by weight of an aromatic vinyl compound, and 5 to 15% by weight of a (meth)acrylate compound. When the content of the conjugated diene compound is less than the range, impact resistance can be reduced. When the content of the conjugated diene compound exceeds the range, rigidity (elastic modulus) can be reduced. In addition, when the content of the (meth)acrylate compound is less than the range, rigidity can be improved, but impact resistance can be reduced. When the content of the (meth)acrylate compound exceeds the range, the effect of increasing rigidity can be reduced.

As the (meth)acrylate compound included in the (meth) acrylate compound-conjugated diene compound-aromatic vinyl compound copolymer, a (meth)acrylate compound commonly used in the art to which the present invention is pertains can be used. For example, the (meth)acrylate compound can include methacrylate or acrylate, and the type of (meth)acrylate compound is not particularly limited. For example, one or more selected from methacrylate and acrylate can be used, and methacrylate can be preferably used. In addition, the conjugated diene compound included in the (meth)acrylate compound-conjugated diene compound-aromatic vinyl compound copolymer can include butadiene, and the type of conjugated diene compound is not particularly limited. In addition, the aromatic vinyl compound included in the (meth)acrylate compound-conjugated diene compound-aromatic vinyl compound copolymer can include one or more selected from styrene, α-methylstyrene, α-ethylstyrene, and p-methylstyrene, preferably styrene.

Accordingly, the (meth)acrylate compound-conjugated diene compound-aromatic vinyl compound copolymer is a resin polymerized using the components according to the specific content ranges. Since the (meth)acrylate component is included in an appropriate amount, a resin capable of improving heat resistance can be included. When necessary, in addition to the (meth)acrylate component, an alkyl acrylate component can be further included.

The (meth)acrylate compound-conjugated diene compound-aromatic vinyl compound copolymer can be a powder having a particle size of 0.2 to 0.4 μm, as a preferred example, 0.25 to 0.35 μm, as a more preferred example, 0.2 to 0.35 μm. In this case, impact strength and injection properties can be improved.

In the present disclosure, particle size can be measured according to a known method of measuring the size of particles. Specifically, the particle size can be measured using BET analysis equipment (Surface Area and Porosity Analyzer ASAP 2020, Micromeritics Co.) according to a nitrogen gas adsorption method. More specifically, 0.3 to 0.5 g of a sample is placed in a tube and pretreated at 100° C. for 8 hours. Then, the particle size of the sample is measured using ASAP 2020 analysis equipment at room temperature. Measurements are repeated three times for the same sample, and the average of the measurements is calculated.

Based on 100% by weight in total of the components constituting the composition, the (meth)acrylate compound-conjugated diene compound-aromatic vinyl compound copolymer can be included in an amount of 10 to 28% by weight, as a preferred example, 10 to 25% by weight, as a more preferred example, 12 to 25% by weight, as a still more preferred example, 13 to 20% by weight, as a most preferred example, 13 to 18% by weight. When the (meth)acrylate compound-conjugated diene compound-aromatic vinyl compound copolymer is included in an amount less than the range, the impact strength of an automotive interior material manufactured using a composite resin composition including the same can be reduced. When the (meth)acrylate compound-conjugated diene compound-aromatic vinyl compound copolymer is included in an amount exceeding the range, the rigidity of an automotive interior material manufactured using a composite resin composition including the same can be reduced.

The carboxy reactive epoxy resin according to an embodiment of the present invention can impart impact stability and crystallization rate controllability to an automotive interior material manufactured using the composite resin composition of the present invention, and the chemical resistance of the automotive interior material can be improved.

In the present disclosure, unless otherwise specified, the "carboxy reactive epoxy resin" refers to an epoxy functional alkylene (meth)acrylic copolymer formed from an epoxy functional (meth)acrylic monomer and an alkylene.

In the present disclosure, unless otherwise specified, "(meth)acrylic" includes both acrylic and methacrylic monomers, and "(meth)acrylate" includes both acrylate and a methacrylate monomer.

Specific examples of the epoxy functional (meth)acrylic monomer can include monomers containing a 1,2-epoxy group such as glycidyl acrylate and glycidyl methacrylate.

In the present disclosure, as a specific example, the carboxy reactive epoxy resin can include one or more selected from an ethylene-n-butyl acrylate-glycidyl methacrylate copolymer, an ethylene-glycidyl methacrylate copolymer, an ethylene-acrylic ester-glycidyl methacrylate copolymer, an ethylene-methyl acrylate-glycidyl methacrylate copolymer, an ethylene-dimethacrylate-glycidyl methacrylate copolymer, an ethylene-acrylate-glycidyl methacrylate copolymer, and an ethylene-vinyl acetate-glycidyl methacrylate copolymer.

For example, the carboxy reactive epoxy resin of the present invention can be a copolymer prepared by polymerizing 1 to 15% by weight or 3 to 10% by weight of a glycidyl methacrylate monomer, 60 to 74% by weight or 63 to 74% by weight of an ethylene monomer, and 20 to 30% by weight or 25 to 30% by weight of n-butyl acrylate. In this case, when an excess of the glycidyl methacrylate monomer is included, the fluidity of a molded article manufactured using a composite resin composition including the same can be reduced, resulting in appearance defects.

Based on 100% by weight in total of the components constituting the composition, the carboxy reactive epoxy resin can be included in an amount of 0.1 to 2.2% by weight, as a preferred example, 0.5 to 2.2% by weight, as a more preferred example, 1 to 2.2% by weight, as a still more preferred example, 1 to 2.1% by weight, as a most preferred example, 1.3 to 2% by weight. When the carboxy reactive epoxy resin is included in an amount exceeding the range, gas can be generated on the surface of an automotive interior material manufactured using a composite resin composition including the same, resulting in appearance defects.

In particular, based on 100% by weight in total of the components constituting the composition, the hydrolysis stabilizer ((meth)acrylate compound-conjugated diene compound-aromatic vinyl compound copolymer+carboxy reactive epoxy resin) can be included in an amount of 15.1 to 20% by weight, as a preferred example, 15.2 to 21% by weight, as a more preferred example, 15.3 to 20% by weight. When the hydrolysis stabilizer is included in an amount exceeding the range, the surface quality of an automotive interior material manufactured using a composite resin composition including the same can be poor, resulting in appearance defects. When the hydrolysis stabilizer is included in an amount less than the range, impact stability and crystallization rate controllability may not be provided sufficiently. In addition, the effect of inhibiting transesterification reaction may not be provided. When the hydrolysis stabilizer is included in an amount within the range, impact strength, in particular impact strength at low temperature, heat resistance, and processability can be improved.

The glass fiber according to an embodiment of the present invention can increase the rigidity of an automotive interior material manufactured using the composite resin composition of the present invention, thereby improving the mechanical properties thereof.

As a specific example, the glass fiber can include 45 to 55% by weight of silica, 15 to 32% by weight of alumina, and 15 to 32% by weight of calcium oxide. When glass fiber satisfying the range is used, a thermoplastic resin composition having excellent balance between chemical resistance, mechanical properties, and heat resistance can be obtained.

In one embodiment of the present invention, the glass fiber includes preferably 50 to 55% by weight of silica, 15 to 27% by weight of alumina, and 15 to 25% by weight of calcium oxide, more preferably 51 to 53% by weight of silica, 17 to 19% by weight of alumina, and 15 to 17% by weight of calcium oxide. In this case, a thermoplastic resin composition having excellent physical property balance between processability, specific gravity, and mechanical properties can be obtained, and a molded article having high heat resistance, high rigidity, and high toughness can be manufactured using the thermoplastic resin composition.

The glass fiber of the present invention can have a circular cross-section or a flat cross-section. When the glass fiber satisfies the above-described range and has the above-described cross-section, excellent rigidity and appearance can be secured, and weight reduction can be achieved.

For example, the glass fiber can have an aspect ratio of 1:1 to 1:4, as a specific example, 1:1 to 1:3, more specifically 1:1. Here, the aspect ratio is expressed as the ratio (L/D) of length (L) to diameter (D). Within this range, the thermoplastic resin composition of the present invention can have high rigidity and toughness, and the elongation and appearance thereof can be improved. As a specific example, the glass fiber can have an aspect ratio of 1:3 to 1:4, more specifically 1:4. Within this range, in addition to high rigidity and toughness, a product advantageous in terms of flatness, deformation, and orientation can be provided.

In the present disclosure, diameter and length can be measured using a scanning electron microscope (SEM). Specifically, 20 inorganic fillers are selected using a scanning electron microscope, the diameter and length of each inorganic filler are measured using an icon bar capable of measuring diameter, and then the average diameter and average length are calculated.

For example, the diameter can be 10 to 13 μm, as a specific example, 10 to 11 μm, and the length can be 2.5 to 6 mm, as a specific example, 3 to 4 mm. Within this range, processability can be improved, and thus the tensile strength of a molded article manufactured by molding the thermoplastic resin composition of the present invention can be improved.

The cross-section of the glass fiber can have a circular, rectangular, elliptical, dumbbell, or rhombic shape.

In one embodiment of the present invention, the glass fiber can be used in combination with other inorganic fibers, and the inorganic fibers can include one or more selected from carbon fibers, basalt fibers, and natural fibers such as kenaf and hemp.

In one embodiment of the present invention, during fiber manufacturing or post-processing, the glass fiber can be treated with a sizing agent, such as a lubricant, a coupling agent, and a surfactant.

The lubricant is mainly used to form a good strand when manufacturing glass fiber, and the coupling agent plays a role in enabling good adhesion between glass fiber and a base resin. When the types of base resin and glass fiber are properly selected, excellent physical properties can be imparted to the thermoplastic resin composition.

The coupling agent can be applied directly to glass fiber or added to an organic matrix. To sufficiently exhibit the performance of the coupling agent, the content thereof can be appropriately selected.

Examples of the coupling agent include amine-based coupling agents, acrylic coupling agents, and silane-based coupling agents, preferably silane-based coupling agents.

As a specific example, the silane-based coupling agents can include γ-aminopropyl triethoxysilane, γ-aminopropyl trimethoxysilane, N-(beta-aminoethyl) γ-aminopropyl triethoxysilane, γ-methacryloxypropyl triethoxysilane, γ-glycidoxypropyl trimethoxysilane, and β-(3,4-epoxyethyl) γ-aminopropyl trimethoxysilane.

For example, based on 100% by weight in total of the components constituting the composition, the glass fiber of the present invention can be included in an amount of 10 to 28% by weight, as a preferred example, 10 to 25% by weight, as a more preferred example, 15 to 25% by weight, as a still more preferred example, 15 to 22% by weight, as a most preferred example, 18 to 22% by weight. When the glass fiber is included in an amount less than the range, cracks can occur in an automotive interior material manufactured using a composite resin composition including the same. When the glass fiber is included in an amount exceeding the range, the rigidity and heat resistance of an automotive interior material manufactured using a composite resin composition including the same can be reduced.

The composite resin composition according to one embodiment of the present invention can further include other additives to improve the flowability thereof.

Specifically, the composite resin composition can include one or more additives selected from a lubricant, a heat stabilizer, and a hydrolysis suppressor.

A lubricant can be used in the present invention without particular limitation as long as the lubricant can secure flowability and the ease of ejection of an injection screw used to manufacture an automotive interior material using a composite resin composition including the lubricant.

Any lubricant capable of securing the properties can be used in the present invention without particular limitation. Preferably, polyethylene-based wax can be used.

For example, based on 100% by weight in total of the components constituting the composition, the lubricant can be included in an amount of 0.01 to 5% by weight, as a preferred example, 0.1 to 3% by weight, as a more preferred example, 0.1 to 2% by weight, as a still more preferred example, 0.1 to 1% by weight, as a most preferred example, 0.1 to 0.5% by weight. When the lubricant is included in an amount exceeding the range, stains can be formed on the surface of an automotive interior material manufactured using a composite resin composition including the same, resulting in appearance defects.

A heat stabilizer capable of preventing deformation of an automotive interior material manufactured using a composite resin composition including the same can be used in the present invention without particular limitation.

Any heat stabilizer capable of securing the properties can be used without particular limitation. Preferably, a phenolic antioxidant can be used as the heat stabilizer.

The phenolic antioxidant can include a hindered phenolic stabilizer having a crystallization temperature (Tm) of 110 to 130° C., and as a specific example, can include tetrakis [ethylene-3-(3,5-di-t-butyl-hydroxyphenyl)-propionate], octadecyl 3-(3,5-di-t-butyl-4-hydroxyphenyl)-propionate, or a combination thereof.

For example, based on 100% by weight in total of the components constituting the composition, the heat stabilizer can be included in an amount of 0.01 to 5% by weight, as a preferred example, 0.01 to 3% by weight, as a more preferred example, 0.01 to 2% by weight, as a still more preferred example, 0.01 to 1% by weight, as a most preferred example, 0.05 to 0.5% by weight. When an excess of the heat stabilizer is included, stains can be formed on the surface of an automotive interior material manufactured using a composite resin composition including the same, resulting in appearance defects.

Various known hydrolysis suppressors can be used as the hydrolysis suppressor according to the present invention within the range that does not adversely affect the thermoplastic resin composition of the present invention. Representative commercially available hydrolysis suppressors include organic or inorganic phosphate compounds such as sodium phosphate monobasic having a chemical formula of $NaH_2PO_4$.

For example, based on 100% by weight in total of the components constituting the composition, the hydrolysis suppressor can be included in an amount of 0.01 to 5% by weight, as a preferred example, 0.1 to 3% by weight, as a more preferred example, 0.1 to 2% by weight, as a still more preferred example, 0.1 to 1% by weight, as a most preferred example, 0.1 to 0.5% by weight. When the hydrolysis suppressor is included in an amount exceeding the range, stains can be formed on the surface of an automotive interior material manufactured using a composite resin composition including the same, resulting in appearance defects.

When a specimen is prepared using the composite resin composition and the high-load heat deflection temperature thereof is measured according to ISO 75, the specimen has a high-load heat deflection temperature of 180° C. or higher, as a specific example, 184 to 190° C.

In the present disclosure, high-load heat deflection temperature can be measured under a high load of 1.82 MPa according to ISO 75.

Hereinafter, a method of preparing the composite resin composition of the present invention will be described in detail.

Method of Preparing Composite Resin Composition

In describing a method of preparing the composite resin composition of the present invention, all of the above-described composite resin compositions are included.

For example, the method of preparing a composite resin composition according to the present invention includes a step of melt-kneading and extruding, using an extruder, 47 to 52% by weight of a polybutylene terephthalate resin; 15 to 28% by weight of a (meth)acrylate compound-conjugated diene compound-aromatic vinyl compound copolymer; 8 to 14% by weight of a polyethylene terephthalate resin; 0.1 to 2.2% by weight of a carboxy reactive epoxy resin; 10 to 28% by weight of glass fiber containing $SiO_2$, Cao, and $Al_2O_3$, wherein an $SiO_2$ content is greater than a sum of a Cao content and an $Al_2O_3$ content; and 0.01 to 10% by weight of additives.

For example, in the melt-kneading step, the above-described other additives can be added.

For example, the melt-kneading and extrusion step can be performed using one or more selected from a single-screw extruder, a twin-screw extruder, and a Banbury mixer, preferably a twin-screw extruder. Specifically, the melt-kneading and extrusion step can be performed by uniformly mixing a composition using a twin-screw extruder and extruding the composition to obtain a composite resin composition in pellet form. In this case, mechanical properties, thermal properties, plating adhesion, and appearance can be excellent.

For example, the step of preparing pellets using an extrusion kneader can be performed at an extrusion temperature of 250 to 300° C., a flow ratio (F/R) of 10 to 59 kg/hr, and a screw rotation rate of 200 to 390 rpm, preferably an extrusion temperature of 250 to 280° C., an F/R of 10 to 40 kg/hr, and a screw rotation rate of 220 to 300 rpm.

After extruding the composite resin composition, a step of performing injection at an injection temperature of 240 to 280° C., as a specific example, 250 to 270° C., a mold temperature of 40 to 80° C., as a specific example, 50 to 70° C., and an injection rate of 10 to 50 mm/see, as a specific example, 10 to 30 mm/see can be included.

In addition, an automotive interior material including the composite resin composition of the present invention will be described. In describing the automotive interior material including the composite resin composition of the present invention, all of the above-described composite resin composition is included.

Automotive Interior Material

Since the components of the composite resin composition of the present invention sufficiently complement each other, the composite resin composition can be used to manufacture automotive interior materials requiring excellent moldability, mechanical properties, high-load heat resistance, and chemical resistance.

The automotive interior materials can be manufactured using methods commonly used in the art. For example, the automotive interior materials can be manufactured using the melt-kneaded product or pellets of the composite resin composition of the present invention or a sheet (plate) molded therefrom as a raw material according to molding methods such as injection molding, injection compression molding, extrusion molding (sheet casting), press molding, pressure molding, heat bending molding, compression molding, calendar molding, or rotational molding.

For example, when the composite resin composition of the present invention is prepared, a polybutylene terephthalate resin, a polyethylene terephthalate resin, a (meth)acrylate compound-conjugated diene compound-aromatic vinyl compound copolymer, a carboxy reactive epoxy resin, and additives are fed into a main inlet at a flow ratio (F/R) of 39 kg/h and 250 rpm; additives are fed into a side inlet at a flow ratio (F/R) of 11 kg/h; and then melt-kneading and extrusion are performed using a twin-screw extruder (φ40, L/D: 42, SM Platek equipment) set to 260° C. to obtain pellets.

The pellets are injected into an injection molding machine to manufacture an automotive interior material.

To indirectly check the physical properties of the manufactured automotive interior material, the pellets are injected at an injection temperature of 260° C., a mold temperature of 60° C., and an injection rate of 30 mm/sec using an injection machine (ENGEL Co., 80 ton) to obtain a specimen conforming to ISO standards.

For example, the prepared specimen can have a melt flow rate of 30 g/10 min or more, as a specific example, 30 to 34 g/10 min as measured at 250° C. under a load of 5 kg according to ISO 1133.

In addition, for example, the specimen can have a Notched Izod impact strength of 10 KJ/m$^2$ or more, as a specific example, 11 to 12 kJ/m$^2$ as measured at 23° C. according to ISO 1133.

In addition, the specimen can have a tensile strength of 90 MPa or more, as a specific example, 92 to 99 MPa as measured at a rate of 50 mm/min according to ISO 527.

In addition, for example, when flexural strength and flexural modulus are measured at a rate of 2 mm/min using an ⅛-inch specimen using a SPAN 64 according to ISO 178, the specimen can have a flexural strength of 135 MPa or more, as a specific example, 136 to 144 MPa, and a flexural modulus of 5,000 MPa or more, as a specific example, 5,020 to 5,070 MPa.

As a specific example, the automotive interior material can be a housing for automotive electronic device integration control components (body control module), but the present invention is not limited thereto.

That is, the composite resin composition according to one embodiment of the present invention includes a composite resin including a specific content (wt %) of a polybutylene terephthalate resin and a specific content (wt %) of a polyethylene terephthalate resin; and a hydrolysis stabilizer including a specific content (wt %) of a (meth)acrylate compound-conjugated diene compound-aromatic vinyl compound copolymer and a specific content (wt %) of a carboxy reactive epoxy resin. When an automotive interior material is manufactured using the composition, since conventional components are replaced by the components of the present invention, heat resistance, impact stability, and crystallization rate controllability can be improved, physical property balance between mechanical properties and fluidity can be satisfied, and product reliability and appearance can be excellent.

In describing the composite resin composition of the present invention, the method of preparing the same, and the automotive interior material including the same, it should be noted that other conditions or equipment not explicitly described herein can be appropriately selected within the range commonly practiced in the art without particular limitation.

Hereinafter, examples of the present invention will be described in detail so that those skilled in the art to which the present invention pertains can easily practice the present invention. However, the present invention can be implemented in various different forms and is not limited to these examples.

EXAMPLES

Examples 1 to 3 and Comparative Examples 1 to 7

Preparation of Composite Resin Composition

The materials used in Examples are as follows.

A-1) Polybutylene terephthalate resin (Intrinsic viscosity (IV): 0.7)

A-2) Polybutylene terephthalate resin (Intrinsic viscosity (IV): 0.8)

B) Polyethylene terephthalate Homo resin (Intrinsic viscosity (IV): 0.8, melting point: 250 to 256° C., crystallization temperature (Tm): 254° C.)

C1) Methacrylate-butadiene-styrene copolymer (Particle size: 0.3 μm, methylmethacrylate: 15% by weight, butadiene: 80% by weight, styrene: 5% by weight, weight average molecular weight: 103,000 g/mol)

C2) Acrylonitrile-styrene-butyl acrylate copolymer (Acrylonitrile: 25% by weight, styrene: 34% by weight, butyl acrylate: 41% by weight, weight average molecular weight: 130,000 g/mol)

C3) Acrylonitrile-butadiene-styrene copolymer (Acrylonitrile: 10% by weight, butadiene: 60% by weight, styrene: 30% by weight, weight average molecular weight: 78,000 g/mol)

D) Ethylene-n-butyl acrylate-glycidyl methacrylate copolymer (Ethylene: 67% by weight, n-butyl acrylate: 28% by weight, glycidyl methacrylate: 5% by weight)

(E) Glass fiber: Glass fiber (Average length: 3 mm, average particle diameter: 10 μm) containing 52% by weight of silica, 18% by weight of alumina, 16% by weight of calcium oxide, and 14% by weight of other additives including MgO (Additives)

F) Lubricant: Polyethylene wax (LDPE wax)

G) Hydrolysis suppressor (transesterification inhibitor): Sodium phosphate monobasic represented by Chemical Formula of $NaH_2PO_4$ H) heat stabilizer (High phenolic antioxidant)

The raw materials for preparing a composite resin composition shown in Table 1 below were mixed and extruded to obtain a composite resin composition having a uniform dispersion degree in pellet form. Then, a specimen usable as an automotive interior material was prepared through an injection process of heating the pellets, injecting the pellets into a mold, and cooling the pellets.

Specifically, the components shown in Table 1 below were mixed using a mixer. Then, using a twin-screw extruder (φ40, L/D: 42, SM Platek equipment) set to 260° C., the mixture was fed into a main inlet at a flow ratio (F/R) of 39 kg/h and 250 rpm, additives were fed into a side inlet at a flow ratio (F/R) of 11 kg/h, and then extrusion was performed for 1 to 3 minutes to obtain a composite resin composition in pellet form.

The prepared pellets were dried in a convection oven at 80° C. for more than 4 hours, and then injected at an injection temperature of 260° C., a mold temperature of 60° C., and an injection rate of 30 mm/see using an injection machine (ENGEL Co., 80 ton) to obtain an ISO specimen.

TABLE 1

| Classification | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| A-1 | 51.7 | 51.2 | 49.2 | 50.7 | 48.7 | — | — | 51.2 | 51.2 | 51.2 |
| A-2 | — | — | — | — | — | 49.2 | 45.2 | — | — | — |
| B | 10.0 | 10.0 | 10.0 | 10.0 | 10.0 | 10.0 | 10.0 | 10.0 | 10.0 | 10.0 |
| C-1 | 14.0 | 14.0 | 16.0 | 14.0 | 16.0 | 16.0 | 20.0 | 16.0 | — | — |
| C-2 | — | — | — | — | — | — | — | — | 16.0 | |
| C-3 | — | — | — | — | — | — | — | — | — | 16.0 |
| D | 1.5 | 2.0 | 2.0 | 2.5 | 2.5 | 2.0 | 2.0 | — | — | — |
| E | 22.0 | 22.0 | 22.0 | 22.0 | 22.0 | 22.0 | 22.0 | 22.0 | 22.0 | 22.0 |
| E | 0.3 | 0.3 | 0.3 | 0.3 | 0.3 | 0.3 | 0.3 | 0.3 | 0.3 | 0.3 |
| G | 0.1 | 0.1 | 0.1 | 0.1 | 0.1 | 0.1 | 0.1 | 0.1 | 0.1 | 0.1 |
| H | 0.4 | 0.4 | 0.4 | 0.4 | 0.4 | 0.4 | 0.4 | 0.4 | 0.4 | 0.4 |

For reference, the total amount of raw materials (A-1~H) shown in Table 1 is 100% by weight.

Experimental Example 1: Evaluation of Physical Properties of Specimens

The physical properties of the specimens prepared in Examples 1 to 3 and Comparative Examples 1 to 7 were evaluated, and the evaluation methods are as follows.

Fluidity (Melt flow rate): performed according to ISO 1133 (250° C., 5 kg)

Impact strength (Izod): performed according to ISO 180/1A (Notched, 23° C.)

Tensile strength and elongation: performed according to ISO 527 (50 mm/min)

Flexural strength and flexural modulus: performed according to ISO 178 (⅛ inch, SPAN 64, rate: 2 mm/min)

Heat deflection temperature: performed according to ISO 75 (high load: 1.82 MPa)

The results measured according to the evaluation criteria are shown in Table 2 below.

TABLE 2

| Classification | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Fluidity (g/10 min) | 34 | 32 | 30 | 31 | 30 | 20 | 15 | 35 | 53 | 40 |
| Tensile strength (MPa) | 99 | 99 | 92 | 98 | 91 | 92 | 89 | 88 | 102 | 95 |

TABLE 2-continued

| Classification | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Tensile elongation (%) | 4.0 | 4.0 | 4.0 | 4.0 | 4.0 | 4.0 | 4.0 | 5.0 | 4.0 | 4.0 |
| Flexural strength (MPa) | 144 | 144 | 136 | 141 | 134 | 136 | 136 | 130 | 144 | 141 |
| Flexural modulus (MPa) | 5070 | 5070 | 5025 | 4965 | 4845 | 5025 | 5025 | 4840 | 5260 | 5165 |
| Impact strength (kJ/m$^2$) | 11.4 | 11.4 | 11.7 | 11.5 | 11.6 | 11.4 | 14.1 | 11.7 | 9.5 | 11.4 |
| Heat deflection temperature (high load, ° C.) | 185 | 190 | 184 | 188 | 182 | 186 | 183 | 140 | 158 | 160 |

Referring to Table 2, the composite resin compositions of Examples 1 to 3 according to the present invention have high impact strength, flexural modulus, high-load heat deflection temperature, and hydrolysis resistance. Due to these properties, automotive interior materials manufactured using the composite resin compositions satisfy basic physical properties such as impact strength, tensile strength, and flexural strength and have excellent chemical resistance and high-load heat resistance. In addition, gas generated during injection can be reduced, thereby providing excellent product reliability and appearance.

In addition, in the case of Comparative Example 1 including a hydrolysis stabilizer in an inappropriate amount, and in the case of Comparative Example 2 including the polybutylene terephthalate resin in a small amount, compared to Examples 1 to 3, the flexural modulus was significantly reduced, and the appearance of molded articles was also poor.

In addition, in the case of Comparative Example 3 including the polybutylene terephthalate resin in a very small amount and Comparative Example 4 including the (meth) acrylate compound-conjugated diene compound-aromatic vinyl compound copolymer as a hydrolysis stabilizer in an amount exceeding the range of the present invention, compared to Examples 1 to 3, flexural modulus and flexural strength are reduced.

In addition, in the case of Comparative Example 5 not including the (meth)acrylate compound-conjugated diene compound-aromatic vinyl compound copolymer as a hydrolysis stabilizer, flexural modulus and high-load heat deflection temperature are poor.

In addition, in the case of Comparative Example 6 including ASA as a hydrolysis stabilizer instead of the (meth) acrylate compound-conjugated diene compound-aromatic vinyl compound copolymer and Comparative Example 7 including ABS as a hydrolysis stabilizer instead of the (meth)acrylate compound-conjugated diene compound-aromatic vinyl compound copolymer, compared to Examples 1 to 3, heat resistance and impact strength are poor.

Comparative Examples 8 to 13: Preparation of Composite Resin Composition

Specimens were prepared in the same procedure as in Example 1, except that raw materials for preparing a composite resin composition shown in Table 3 below were mixed.

TABLE 3

| Classification | Comparative Example 8 | Comparative Example 9 | Comparative Example 10 | Comparative Example 11 | Comparative Example 12 | Comparative Example 13 |
|---|---|---|---|---|---|---|
| A-1 | 53 | 52.2 | 44.2 | 56.2 | 62.2 | 41.2 |
| A-2 | — | — | — | — | — | — |
| B | 10 | 7 | 15 | 10 | 10 | 10 |
| C-1 | 12.2 | 16 | 16 | 9 | 16 | 16 |
| C-2 | — | — | — | — | — | — |
| C-3 | — | — | — | — | — | — |
| D | 2 | 2 | 2 | 2 | 2 | 2 |
| E | 22 | 22 | 22 | 22 | 9 | 30 |
| E | 0.3 | 0.3 | 0.3 | 0.3 | 0.3 | 0.3 |
| G | 0.1 | 0.1 | 0.1 | 0.1 | 0.1 | 0.1 |
| H | 0.4 | 0.4 | 0.4 | 0.4 | 0.4 | 0.4 |

For reference, the total amount of raw materials (A-1~H) shown in Table 3 is 100% by weight.

Experimental Example 2: Evaluation of Physical Properties of Specimens

The physical properties of specimens prepared in Comparative Examples 8 to 13 were evaluated according to the above evaluation methods.

TABLE 4

| Classification | Comparative Example 8 | Comparative Example 9 | Comparative Example 10 | Comparative Example 11 | Comparative Example 12 | Comparative Example 13 |
|---|---|---|---|---|---|---|
| Fluidity (g/10 min) | 36 | 28 | 20 | 36 | 30 | 28 |
| Tensile strength (MPa) | 92 | 94 | 94 | 94 | 94 | 92 |
| Tensile elongation (%) | 4.0 | 4.0 | 4.0 | 4.0 | 4.0 | 4.0 |
| Flexural strength (MPa) | 136 | 139 | 139 | 146 | 116 | 166 |
| Flexural modulus (MPa) | 5025 | 4980 | 4895 | 5225 | 4025 | 6025 |
| Impact strength (kJ/m$^2$) | 10.7 | 10.5 | 11.8 | 7.4 | 11.4 | 9.4 |
| Heat deflection temperature (high load, ° C.) | 178 | 186 | 178 | 184 | 130 | 182 |

Referring to Table 4, in the case of Comparative Example 8 including an excess of the polybutylene terephthalate resin, compared to Examples 1 to 3, flexural strength is poor.

In addition, in the case of Comparative Example 9 including a small amount of the polyethylene terephthalate resin and Comparative Example 10 including an excess of the polyethylene terephthalate resin, compared to Examples 1 to 3, fluidity, flexural modulus, and flexural strength are poor. In particular, in the case of Comparative Example 10, heat deflection temperature is also reduced, and thus heat resistance is deteriorated.

In addition, in the case of Comparative Example 11 including the (meth)acrylate compound-conjugated diene compound-aromatic vinyl compound copolymer as a hydrolysis stabilizer in an amount less than the range of the present invention, compared to Examples 1 to 3, impact strength is deteriorated.

In addition, in the case of Comparative Example 12 including a small amount of glass fiber, compared to Examples 1 to 3, heat deflection temperature is remarkably lowered and heat resistance is poor. Also, flexural strength and flexural modulus are reduced.

In addition, in the case of Comparative Example 13 including an excess of glass fiber, compared to Examples 1 to 3, fluidity and impact strength are reduced.

In conclusion, since the composite resin composition according to one embodiment of the present invention includes a composite resin including a specific content (wt %) of a polybutylene terephthalate resin and a specific content (wt %) polyethylene terephthalate resin; and a hydrolysis of a stabilizer including a specific content (wt %) of a (meth)acrylate compound-conjugated diene compound-aromatic vinyl compound copolymer and a specific content (wt %) of a carboxy reactive epoxy resin, the heat resistance, impact stability, and crystallization rate controllability of automotive interior materials manufactured using the composition can be improved, and thus the automotive interior materials can satisfy the physical property balance between mechanical properties and fluidity and provide excellent product reliability and appearance.

The invention claimed is:

1. A composite resin composition, comprising:
   47 to 52% by weight of a polybutylene terephthalate resin;
   10 to 28% by weight of a (meth)acrylate compound-conjugated diene compound-aromatic vinyl compound copolymer;
   8 to 14% by weight of a polyethylene terephthalate resin;
   0.1 to 2.2% by weight of a carboxy reactive epoxy resin;
   10 to 28% by weight of glass fiber containing $SiO_2$, CaO, and $Al_2O_3$, wherein an $SiO_2$ content is greater than a sum of a CaO content and an $Al_2O_3$ content; and
   0.01 to 10% by weight of an additive, wherein the additive comprises organic phosphate or inorganic phosphate, and
   wherein the polybutylene terephthalate resin has an intrinsic viscosity of 0.45 to 0.77 dl/g, and the polyethylene terephthalate resin has an intrinsic viscosity of 0.78 to 1.2 dl/g.

2. The composite resin composition according to claim 1, wherein the inorganic phosphate is $NaH_2PO_4$.

3. The composite resin composition according to claim 1, wherein the (meth)acrylate compound-conjugated diene compound-aromatic vinyl compound copolymer comprises a graft copolymer prepared by polymerizing 40 to 80% by weight of a conjugated diene compound, 10 to 40% by weight of an aromatic vinyl compound, and 1 to 20% by weight of a (meth)acrylate compound.

4. The composite resin composition according to claim 1, wherein the carboxy reactive epoxy resin comprises one or more selected from an ethylene-n-butyl acrylate-glycidyl methacrylate copolymer, an ethylene-glycidyl methacrylate copolymer, an ethylene-acrylic ester-glycidyl methacrylate copolymer, an ethylene-methyl acrylate-glycidyl methacrylate copolymer, an ethylene-dimethacrylate-glycidyl methacrylate copolymer, an ethylene-acrylate-glycidyl methacrylate copolymer, and an ethylene-vinyl acetate-glycidyl methacrylate copolymer.

5. The composite resin composition according to claim 1, wherein the carboxy reactive epoxy resin comprises 1 to 15% by weight of a glycidyl methacrylate-derived monomer.

6. The composite resin composition according to claim 1, wherein the composite resin composition further comprises one or more additives selected from among a low-viscosity polyethylene-based lubricant and a phenolic antioxidant.

7. The composite resin composition according to claim 1, wherein the composite resin composition has a high-load heat resistance of 180° C. or higher as measured under 1.82 MPa according to ISO 75.

8. The composite resin composition according to claim 1, wherein the composite resin composition has a flexural strength of 140 MPa or more and a flexural modulus of 5,000 MPa or more as measured at a rate of 2 mm/min using an ⅛-inch specimen using a SPAN 64 according to ISO 178.

9. A method of preparing a composite resin composition, comprising:

melt-kneading and extruding, using an extruder, 47 to 52% by weight of a polybutylene terephthalate resin; 10 to 28% by weight of a (meth)acrylate compound-conjugated diene compound-aromatic vinyl compound copolymer; 8 to 14% by weight of a polyethylene terephthalate resin; 0.1 to 2.2% by weight of a carboxy reactive epoxy resin;

10 to 28% by weight of glass fiber containing $SiO_2$, CaO, and $Al_2O_3$, wherein an $SiO_2$ content is greater than a sum of a CaO content and an $Al_2O_3$ content; and 0.01 to 10% by weight of an additive, wherein the additive comprises organic phosphate or inorganic phosphate, and wherein the polybutylene terephthalate resin has an intrinsic viscosity of 0.45 to 0.77 dl/g, and the polyethylene terephthalate resin has an intrinsic viscosity of 0.78 to 1.2 dl/g.

10. An automotive interior material, comprising the composite resin composition according to claim 1.

11. The automotive interior material according to claim 10, wherein the automotive interior material is a housing for automotive electronic device integration control components.

* * * * *